(No Model.) 3 Sheets—Sheet 3.

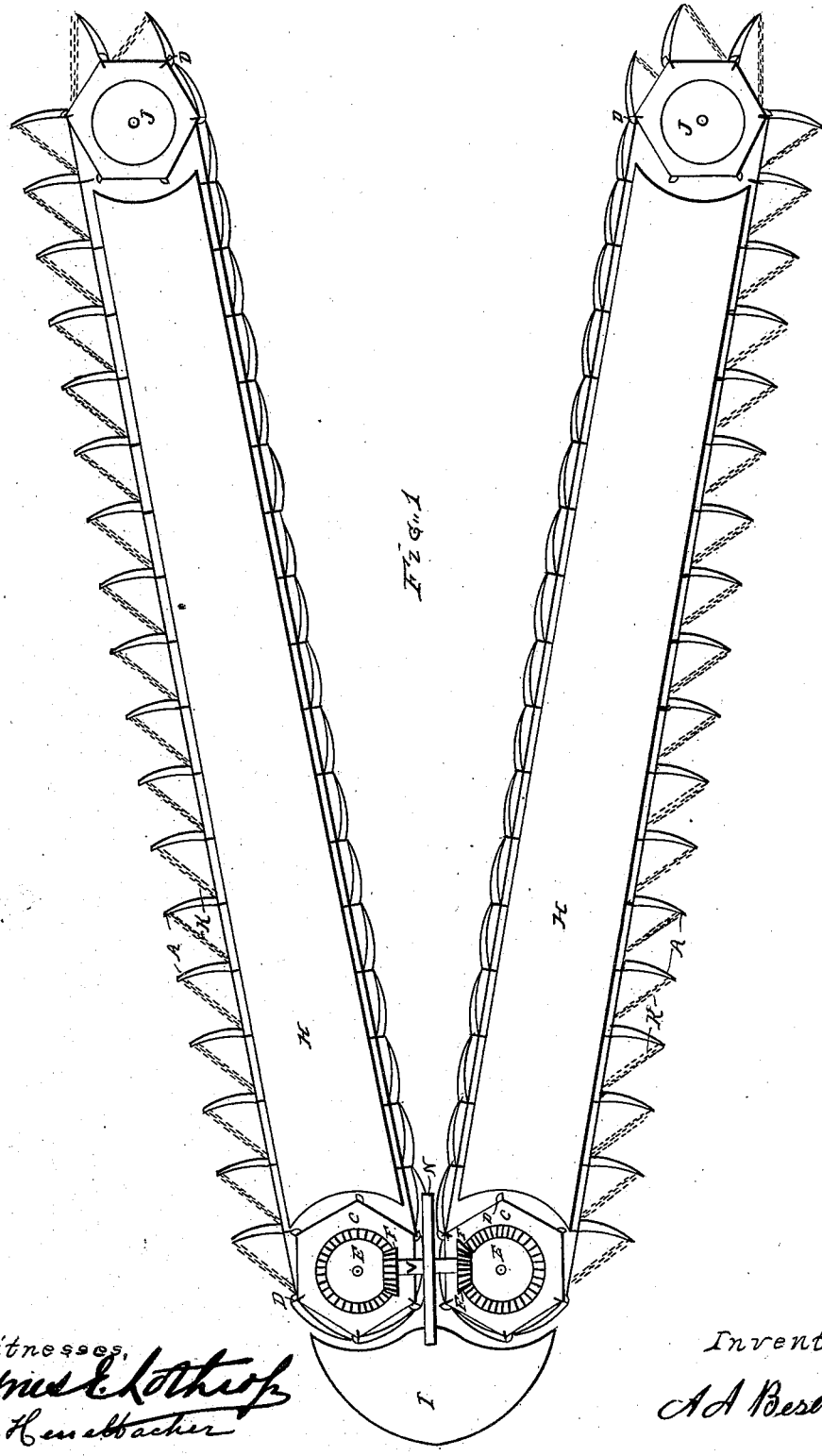

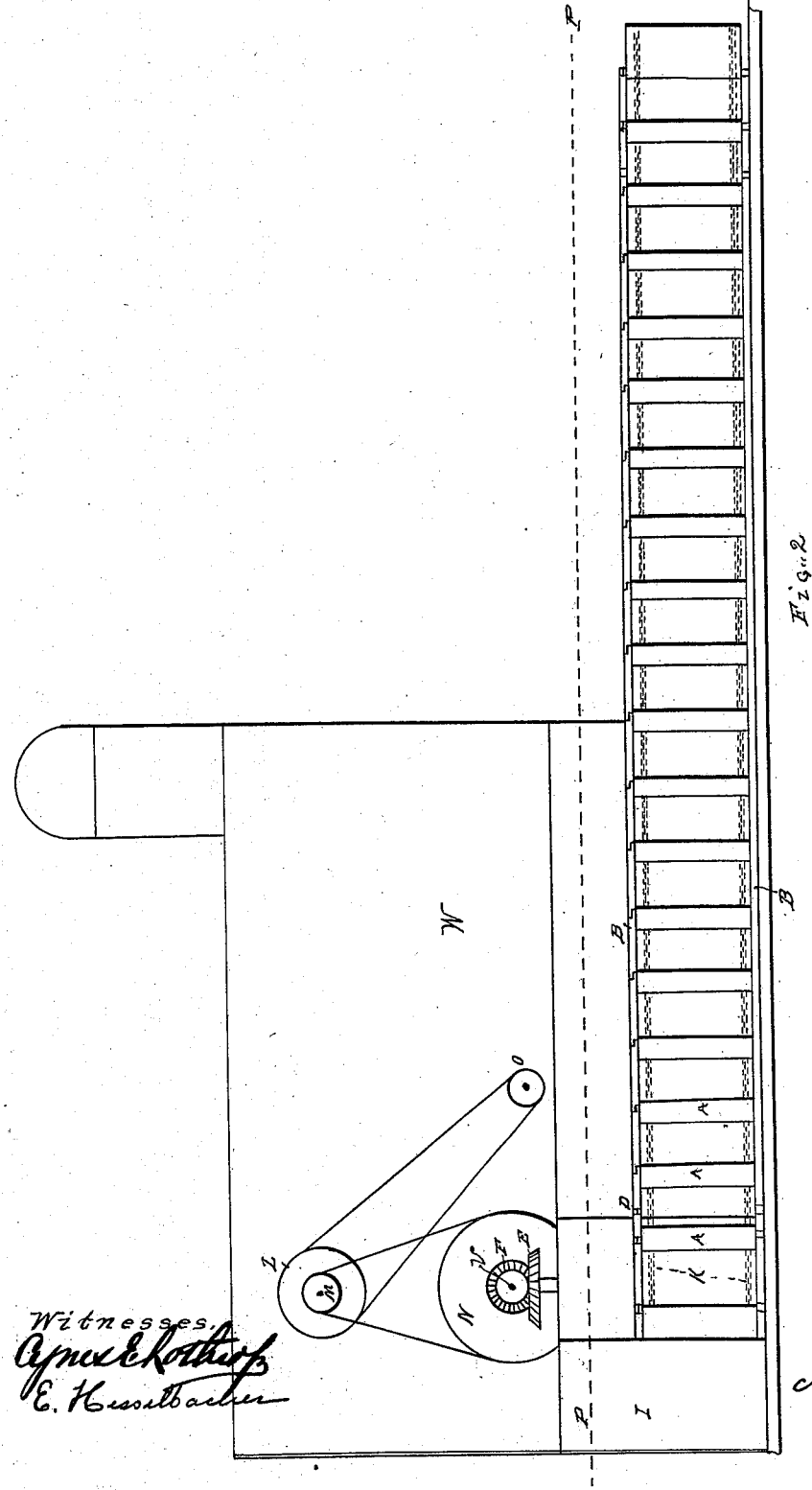

A. A. BESEMER.
WATER MOTOR.

No. 402,055. Patented Apr. 23, 1889.

Witnesses
Cyrus E. Lothrop
E. Husselbacher

Inventor
A. A. Besemer

UNITED STATES PATENT OFFICE.

ANDREW A. BESEMER, OF TECUMSEH, MICHIGAN.

WATER-MOTOR.

SPECIFICATION forming part of Letters Patent No. 402,055, dated April 23, 1889.

Application filed February 25, 1888. Serial No. 265,251. (No model.)

*To all whom it may concern:*

Be it known that I, ANDREW A. BESEMER, of Tecumseh, in the county of Lenawee and State of Michigan, have invented a new and useful Improvement in Water-Motors, of which the following is a specification.

Figure 4:
Figure 3:
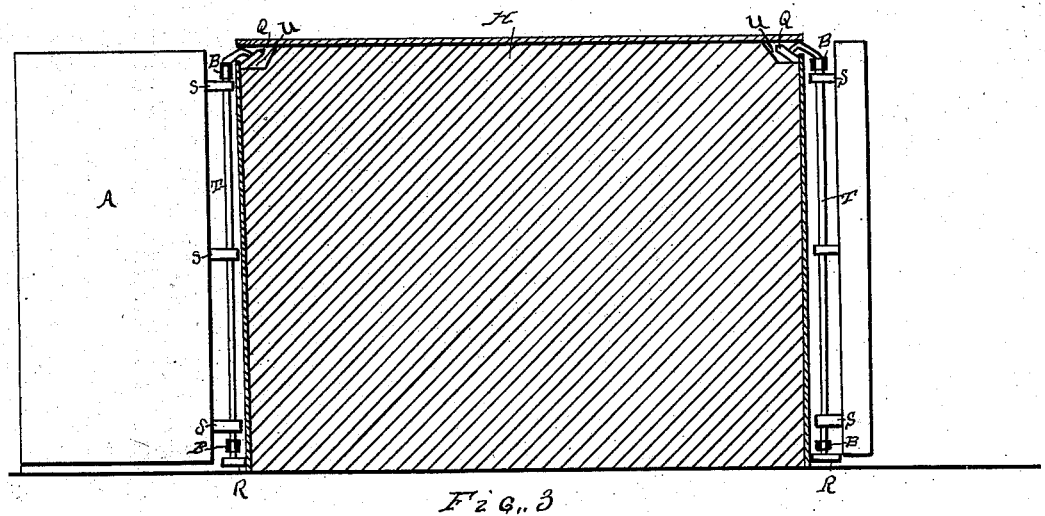

My invention consists in an improvement in water-current motors, hereinafter fully described and claimed.
Figure 1 is a plan view. Fig. 2 is a side elevation. Fig. 3 is a vertical section through one of the piers, H, Fig. 1. Fig. 4 is a horizontal section through one end of the buckets, and Fig. 5 is a detail elevation.
My invention is designed to utilize the power of rivers having a rapid current where there is not sufficient fall to permit the use of ordinary water-wheels.

I represents a pier built in the bed of a stream and rising above the surface of the water, having its upstream side pointed to break floating ice, and H H represent two piers which lead downstream from I and diverging from each other, as shown in Fig. 1.
P represents the surface of the water, and W represents a building for machinery and shafting carried on piers I H H, and having its floor above the water-level, the piers H H being preferably wholly below the water-level, so that floating ice and logs will pass over said piers without damaging them or the motor.

C C represent sprocket-wheels secured on upright shafts between the pier I and heads of piers H, each shaft carrying two wheels having the sprockets D on their periphery, and J J represent similar sprocket-wheels at the tail ends of piers H.

Figure 5:
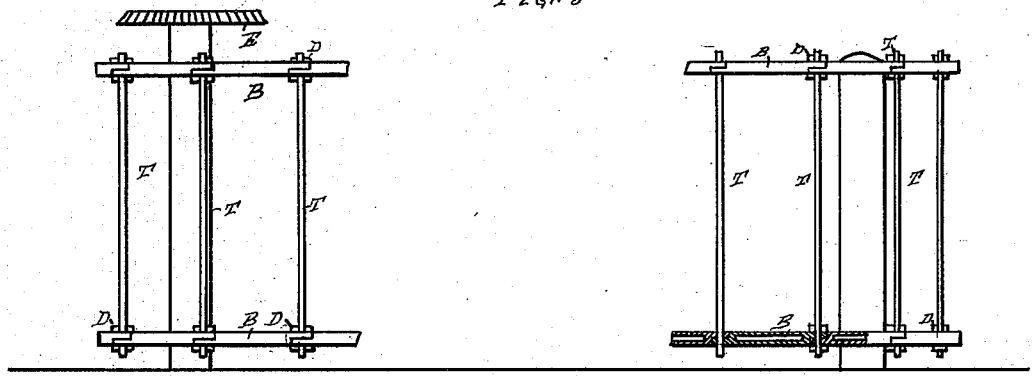

B represents four chains made up of links of proper length for the sprocket-wheels, preferably made hollow, as shown in Fig. 5, for the sake of lightness, and jointed together at their ends by rods T. Two of these endless chains B connect the sprocket-wheels C and J at the respective ends of each pier H.
A represents a series of buckets, preferably curved and made hollow, as shown in Fig. 4, for the purpose of partial flotation to lighten up the moving parts. Each bucket A is hinged at its inner side to one of the rods T by hinges S, as shown in Fig. 3, and its outer ends are stayed to the chains B by one or two chains or cords, K, as shown in Figs. 1 and 2.

Around the upper surface of each pier H is formed a channel, U, in which run friction-rollers Q, secured and journaled on inwardly-projecting arms formed on the upper ends of the rods T; and R represents friction-rollers journaled on the lower ends of the rods T and bearing against the sides of piers H, the object of these friction-rollers and the channel being to support the moving parts and to reduce friction.

E E represent beveled gear-wheels carried on the upper ends of the shafts which carry sprocket-wheels C, and V represents a shaft journaled in suitable bearings, carrying on its end beveled gear meshing with beveled gears E, and also carrying a fly-wheel or belt-pulley, N.

M and L represent a counter-shaft with belt-pulleys thereon, and O represents the machinery to be operated.

The operation of my invention is as follows: The current, dividing on the pier I, flows down along the outer side of the piers H, and, pressing on the buckets A, carries with it said buckets, thus communicating motion to the endless chains B and rotating the sprocket-wheels C and gears E, by which motion is communicated to the pulley N, and thence to the machinery by the usual system of belting. As the chains B pass around the sprocket-wheels J, the buckets A fold close to the side of the pier H, thus presenting very little surface to the water, and the arrangement of the piers I and H makes comparatively slack water between the piers, so there is very little resistance to the travel of the buckets. A number of these motors may be placed in a stream of sufficient size to accommodate the same, and in this case they should be staggered, instead of being placed in line, where there is sufficient room to do so. It will readily be seen that this arrangement permits the current in large and rapid rivers to be utilized as a source of power, and that the power thus derived may be transmitted to the shore by shafting or ropes, or that O may represent one or more dynamo-electric machines whose current may be transmitted by conductors to the place where it is to be utilized.

What I claim as my invention, and desire to secure by Letters Patent, is—

1. A current-motor consisting of a protecting-pier, a submerged pier below the protecting-pier, sprocket-wheels journaled at the ends of said submerged pier and submerged therewith, endless chains connecting said sprocket-wheels, and a series of pivoted hollow buckets carried on said endless chains, substantially as shown and described.

2. A current-motor consisting of a protecting-pier, two submerged piers below said protecting-pier and diverging from each other, sprocket-wheels carried on upright shafts at the ends of said submerged piers, two endless chains connecting the sprocket-wheels at the respective ends of each submerged pier, and a series of pivoted hollow buckets carried on said endless chains, substantially as shown and described.

3. In a current-motor, the combination of the piers H, having the channels V therein, the endless chains B, and the rods T, carrying thereon the friction-rollers Q, moving in said channels at such an angle as to normally prevent their being withdrawn, substantially as described.

A. A. BESEMER.

Witnesses:
CYRUS E. LOTHROP,
E. HESSELBACHER.